(12) United States Patent
Roth

(10) Patent No.: US 10,674,751 B1
(45) Date of Patent: Jun. 9, 2020

(54) HEATING MEDIUM INJECTORS AND INJECTION METHODS FOR HEATING FOODSTUFFS

(71) Applicant: Empirical Innovations, Inc., Dakota Dunes, SD (US)

(72) Inventor: Nicholas A. Roth, Dakota Dunes, SD (US)

(73) Assignee: Empirical Innovations, Inc., Dakota Dunes, SD (US)

( * ) Notice: Subject to any disclaimer, the term of this patent is extended or adjusted under 35 U.S.C. 154(b) by 0 days.

(21) Appl. No.: 16/729,108

(22) Filed: Dec. 27, 2019

Related U.S. Application Data

(60) Provisional application No. 62/808,778, filed on Feb. 21, 2019.

(51) Int. Cl.
*A23L 3/18* (2006.01)
*B01F 3/04* (2006.01)
(Continued)

(52) U.S. Cl.
CPC ............ *A23L 3/001* (2013.01); *A23B 4/0053* (2013.01); *A23B 5/0055* (2013.01); *A23L 3/18* (2013.01);
(Continued)

(58) Field of Classification Search
CPC .... A23L 15/00; A23L 3/18; A23L 3/02; B01F 3/04099; B01F 3/04248; F28C 3/08; A23J 3/00
(Continued)

(56) References Cited

U.S. PATENT DOCUMENTS 2,022,419 A 1/1933 Horneman
2,022,420 A 3/1933 Hammer
(Continued)

FOREIGN PATENT DOCUMENTS

AU 610233 5/1991
CN 204888558 U 12/2015
(Continued)

OTHER PUBLICATIONS

Jelen, P., "Experience with Direct and Indirect U HT Processing of Milk—A Canadian Viewpoint," Journal of Food Protection. vol. 45, No. 9, pp. 878-883 Jul. 1, 1982.
(Continued)

*Primary Examiner* — Robert A Hopkins
(74) *Attorney, Agent, or Firm* — The Culbertson Group, P.C.; Russell D. Culbertson

(57) ABSTRACT

A heating medium injector includes an injector structure defining a heating medium flow path and a product flow path. The heating medium flow path extends to a contact location along an axis of the injector, while the product flow path also extends to the contact location along the injector axis. The contact location comprises a location at which the heating medium flow path and product flow path merge within the injector. In a region along the injector axis, the product flow path is defined between a first flow surface and a second flow surface. The first flow surface comprises a surface of a boundary wall separating the heating medium flow path from the product flow path and the second flow surface comprises a surface of an opposing second boundary wall. The second flow surface is in substantial thermal communication with a second flow surface cooling structure.

19 Claims, 9 Drawing Sheets

(51) Int. Cl.
*A23L 3/00* (2006.01)
*A23B 4/005* (2006.01)
*A23B 5/005* (2006.01)

(52) U.S. Cl.
CPC ...... *B01F 3/04099* (2013.01); *B01F 3/04248* (2013.01); *A23V 2002/00* (2013.01)

(58) Field of Classification Search
USPC .......................................................... 261/77
See application file for complete search history.

(56) References Cited

U.S. PATENT DOCUMENTS

| | | | |
|---|---|---|---|
| 2,852,042 A | 4/1951 | Lynn | |
| 2,737,374 A | 12/1952 | Terrett | |
| 2,909,985 A | 10/1959 | Abrams | |
| 2,975,069 A | 3/1961 | Laguilharre | |
| 2,999,024 A * | 9/1961 | Stimpson | A23L 15/00 426/614 |
| 3,016,815 A | 1/1962 | Hanrahan | |
| 3,093,487 A | 6/1963 | Jones | |
| 3,450,022 A | 6/1969 | Engel | |
| RE27,790 E * | 10/1973 | Rusoff et al. | A23J 3/22 426/476 |
| 3,922,376 A | 11/1975 | Strinning | |
| 3,927,974 A | 12/1975 | Johansson | |
| 3,973,048 A | 8/1976 | Sollerud | |
| 3,988,112 A | 10/1976 | Johansson | |
| 4,200,149 A | 4/1980 | Pechner | |
| 4,234,537 A | 11/1980 | Hersom | |
| 4,375,185 A | 3/1983 | Mencacci | |
| 4,461,780 A | 7/1984 | Mencacci | |
| 4,591,463 A | 5/1986 | Nahra | |
| 4,773,827 A | 9/1988 | Zaiser | |
| 5,271,376 A | 12/1993 | Lu | |
| 5,375,654 A | 12/1994 | Hougland | |
| 5,443,857 A | 8/1995 | Arph | |
| 5,558,819 A | 9/1996 | Hollander | |
| 5,622,655 A | 4/1997 | Cincotta | |
| 5,727,452 A | 3/1998 | Jensen | |
| 5,842,497 A | 12/1998 | Drifka | |
| 5,881,638 A | 3/1999 | Kjaerulff | |
| 5,893,270 A | 4/1999 | Arph | |
| 6,082,712 A | 7/2000 | Cincotta | |
| 6,217,926 B1 * | 4/2001 | Merkle | A23J 7/00 426/425 |
| 6,299,343 B1 | 10/2001 | Pekerman | |
| 6,361,025 B1 | 3/2002 | Cincotta | |
| 6,662,549 B2 | 12/2003 | Burns | |
| 7,108,882 B2 | 9/2006 | Schaefer | |
| 7,111,975 B2 | 9/2006 | Fenton | |
| 7,152,851 B2 | 12/2006 | Cincotta | |
| 7,227,104 B2 | 6/2007 | Ghislain | |
| 7,434,982 B2 | 10/2008 | Nagasawa et al. | |
| 7,673,628 B1 | 3/2010 | Shulman | |
| 8,193,395 B2 | 6/2012 | Fenton | |
| 8,246,015 B2 | 8/2012 | Schreib | |
| 8,419,378 B2 | 4/2013 | Fenton | |
| 9,010,379 B2 | 4/2015 | Gothard et al. | |
| 9,011,953 B2 | 4/2015 | Kowalik | |
| 9,207,017 B2 | 12/2015 | Zaiser | |
| 9,615,593 B2 | 4/2017 | Simunovic | |
| 9,629,377 B2 | 4/2017 | Zietlow | |
| 9,751,742 B2 | 9/2017 | Hayakawa | |
| 9,775,363 B2 | 10/2017 | Rispal | |
| 9,930,898 B2 | 4/2018 | Deane | |
| 2009/0251989 A1 | 10/2009 | Pfefferle et al. | |
| 2011/0287161 A1 | 11/2011 | Weber | |
| 2013/0228348 A1 | 9/2013 | Worthy | |
| 2016/0029666 A1 | 2/2016 | Carpenter | |
| 2016/0143343 A1 | 5/2016 | Schmied | |
| 2017/0347680 A1 | 12/2017 | Valentini | |

FOREIGN PATENT DOCUMENTS

| | | |
|---|---|---|
| EP | 0674538 B1 | 6/1996 |
| EP | 0805714 B1 | 9/1999 |
| EP | 1604731 B1 | 12/2005 |
| GB | 270046 | 5/1927 |
| GB | 2154121 A | 9/1985 |
| JP | 2000262594 A | 9/2000 |

OTHER PUBLICATIONS

Tuan, Truong Ho, "Fouling of stainless steel surfaces by heated whole milk: a thesis presented in partial fulfilment of the requirements for the degree of Doctor of Philosophy in Food Technology," Institute of Food, Nutrition & Human Health, University of Massey, NZ 2001, title pages, pp. i-xi, and pp. 61-81.

* cited by examiner

HEATING MEDIUM INJECTORS AND INJECTION METHODS FOR HEATING FOODSTUFFS

CROSS-REFERENCE TO RELATED APPLICATION

Applicant claims the benefit, under 35 U.S.C. § 119(e), of U.S. Provisional Patent Application No. 62/808,778 filed Feb. 21, 2019, and entitled "Direct Heating Medium Injector and Injection System and Method." The entire content of this provisional application is incorporated herein by this reference.

TECHNICAL FIELD OF THE INVENTION

The invention relates to apparatus and methods for neutralizing pathogens in materials, particularly foodstuffs, by direct injection of a heating medium.

BACKGROUND OF THE INVENTION

Heat treatment is used in the food processing industry to eliminate pathogens and for other purposes. For example, milk may be heated to about 145° F. for about thirty minutes, or to about 162° F. for about fifteen seconds to destroy or deactivate disease-causing microorganisms found in milk. These heat treatment processes are commonly referred to as pasteurization. Milk or cream may also be treated by heating to 280° F. to 302° F. for two or six seconds (or more) in a process referred to as ultra-high-temperature ("UHT") pasteurization. Pasteurization and UHT pasteurization may not entirely sterilize the product being treated, but may be effective for killing or deactivating pathogens present in the product.

Heat treatment of liquid or otherwise pumpable materials like milk and cream may be indirect or direct. In indirect heat treatment systems, the heating medium remains separate from the foodstuff and heat is transferred to the foodstuff in a heat exchange device such as a tube in shell or plate-type heat exchanger. In contrast to indirect heat treatment systems, direct heat treatment systems bring the foodstuff into direct contact with a suitable heating medium such as steam. Although this direct contact with steam adds water to the foodstuff being treated, that added water may be separated from the treated foodstuff as desired.

Direct steam heat treatment systems can be divided generally into steam infusion systems and steam injection systems. In steam infusion systems, steam is directed through a steam inlet into a suitable steam chamber and the product to be treated is directed into the steam chamber through a separate product inlet, commonly a diffuser plate including a number of passages through which relatively fine streams of product may flow into the steam chamber. U.S. Pat. No. 4,591,463 describes examples of steam diffusion systems. In steam injection systems, a steam injector is used to inject steam into a stream of foodstuff flowing through a conduit to rapidly increase the temperature of the foodstuff to a desired treatment temperature. The added steam and product may then be held at an elevated temperature for a desired time by causing the mixture to flow through a hold tube. U.S. Pat. No. 2,022,420 provides an example of a steam injection system.

In both steam infusion and steam injection systems, the water added to the product during treatment may be removed from the product by applying a vacuum sufficient to vaporize the added water, and then drawing off the water vapor. This vaporization of added water also has the effect of rapidly decreasing the temperature of the now heat-treated product. In the case of steam infusion systems, the water and heated product are removed from the steam chamber and then directed to a vacuum chamber for applying the desired vacuum. In the case of steam injection systems, the mixture of heated product and added water is directed from the hold tube into a vacuum chamber where the added water is vaporized and may be drawn off along with any remaining steam.

Although direct steam injection systems are commonly used for heat treating foodstuffs such as milk and juices, problems remain which increase the cost of operating such systems. Perhaps the most persistent problem encountered in direct steam injection systems is the deposition of materials from the product, milk proteins in the case of milk treatment for example, on surfaces within the steam injector and downstream from the steam injector. Among other things, these deposits can reduce flow through the system and must be removed periodically to allow proper operation. This removal of deposits necessitates shutting down the treatment system and these shut downs increase operation costs and reduce productivity. In applications beyond dairy products, deposition may be so rapid that passages carrying the product to be treated become completely plugged in a very short period of time, a few seconds or a few minutes. The deposition problem thus prevents prior direct steam injection systems from being used for heat treating certain products, such as products including meat or egg proteins, especially raw (that is, uncooked) meat proteins in fibrous and other forms.

The problem of product deposition on surfaces of a direct steam injector is exacerbated by the configuration of product flow passages which are intended to facilitate quick and even heating of the product. In particular, direct steam injectors may be configured to produce a narrow stream of product to bring into contact with steam in the injector. In order to produce such a thin stream of product, a direct steam injector may cause the product to flow through a narrow flow passage, particularly a narrow annular flow passage, and steam may be brought into contact with the thin stream of product exiting the narrow flow passage. U.S. Pat. No. 3,988,112 shows an example of a steam injector in which the product to be treated is forced through a narrow annular flow path and steam is applied to the thin stream of product exiting the annular flow path. Although these injector configurations may be effective for allowing the product to be quickly brought to the desired treatment temperature, the narrow structures through which the product must flow are susceptible to rapid deposition of constituents from the product and are subject to plugging from deposited materials. The structure shown in U.S. Pat. No. 3,988,112 attempts to address the problem of product deposition on the injector surfaces downstream of the injection point by releasing a cold liquid along the surfaces containing the heated mixture. This patent also shows cooling surfaces of the injector downstream from the injection point by circulating a coolant through chambers formed in the walls of the injector downstream from the point where steam is injected into the product. While the surface washing and surface cooling in the injector downstream from the injection point may be effective to increase run times for some products, the techniques shown in U.S. Pat. No. 3,988,112 do not eliminate product deposition and may be entirely ineffective for some types of products. Also, the surface washing shown in U.S. Pat. No. 3,988,112 may lead to uneven heating in the product to be treated and may reduce the effectiveness of the heat treatment with regard to eliminating pathogens.

U.S. Patent Application Publication No. 2016/0143343 discloses a direct steam injector in which surfaces within the injector which come in contact with heated product such as milk are formed from polyether ether ketone, commonly referred to as PEEK, in an effort to reduce the tendency for product deposits to form on surfaces of the injector. PEEK is used in this prior injector not only for reducing the tendency for the formation of deposits and burning in the injector, but also for its resistance to cleaning agents and ability to withstand the temperatures encountered in the injector. However, the use of PEEK within the injector disclosed in U.S. Patent Application Publication No. 2016/0143343 does not eliminate product deposition and thus the injection system disclosed in this publication relies on a sensor arrangement which can be used to adjust flow paths within the injector to help ensure the desired level of heating in the product as deposits form on the injector surfaces.

SUMMARY OF THE INVENTION

It is an object of the invention to provide direct heating medium injectors and direct heating medium injection methods which overcome the problem of undue deposition of product constituents on surfaces within the injector. In particular, it is an object of the present invention to provide direct heating medium injectors and direct heating medium injection methods which reduce or eliminate deposits of product constituents on surfaces within the injector to thereby increase run time for products such as milk and to allow heat treatment of products including meat or egg proteins for example, especially raw meat or egg proteins, that could not previously be treated by direct steam injection due to high deposition rates and plugging.

According to various aspects of the present invention described in detail below, some of the surfaces within the injector that come in contact with the product to be treated are cooled by a suitable cooling arrangement to at least reduce the rate at which product constituents form deposits on those surfaces. In particular, certain surfaces within the injector upstream of the steam injection point are cooled by a suitable cooling arrangement. It has been determined that cooling some of these surfaces prevents undue deposition of product constituents on those surfaces, and surprisingly, prevents undue deposition of product constituents on adjacent or nearby surfaces within the injector which are not cooled and are formed from standard injector materials such as stainless steel. Other surfaces in an injector in accordance with the present invention may be formed from a temperature moderating material. As used in this disclosure and the accompanying claims, a "temperature moderating material" (sometimes referred to herein as "TMOD material") comprises a material having a specific heat of no less than approximately 750 J/kg K, and preferably no less than approximately 900 J/kg K, and, more preferably, no less than approximately 1000 J/kg K. A class of materials particularly suited for use as a TMOD material in accordance with the present invention comprises plastics which have a specific heat of no less than approximately 1000 J/kg K and are suitable for providing food contact surfaces, retain structural integrity, maintain dimensional stability, and do not degrade at temperatures which may be encountered in a heating medium injection system (which may be 350° F. or somewhat higher in some applications). Specific examples of suitable TMOD materials will be described below in connection with the illustrated embodiments.

A heating medium injector according to a first aspect of the present invention includes an injector structure, a heating medium flow path defined within the injector structure, and a product flow path defined within the injector structure. The heating medium flow path extends from a heating medium inlet opening to a contact location along an axis of the injector, while the product flow path extends from a product inlet opening to the contact location. The contact location comprises a location at a coordinate along the injector axis at which the heating medium flow path and product flow path merge within the injector structure, that is, first come together along the direction of flow through the injector, to allow mixing of the heating medium and product. In a first region along the injector axis, the product flow path is defined between a first flow surface and a second flow surface. The first flow surface comprises a surface of a first boundary wall separating the heating medium flow path from the product flow path in the first region and the second flow surface comprises a surface of a second boundary wall located opposite to the first flow surface across the product flow path. According to this first aspect of the invention, the second flow surface is in substantial thermal communication with a second flow surface cooling structure. This second flow surface cooling structure is either formed within or connected to the second boundary wall and is isolated from the product flow path.

The present invention also encompasses methods for injecting a heating medium into liquids or other pumpable materials. Methods according to this second aspect of the invention include directing a heating medium in a heating medium flow path and directing a product to be treated in a product flow path, both from a respective inlet location and along an injector axis to a contact location along the injector axis. The product flow path in a first region along the injector axis is defined between a first flow surface and a second flow surface as described above in connection with a heating medium injector according to the first aspect of the invention. Methods embodying this second aspect of the invention also include cooling at least some of the second flow surface through a second flow surface cooling structure isolated from the product flow path. This cooling is performed while the heating medium is directed long the heating medium flow path and the product is directed along the product flow path.

Cooling the second flow surface of the product flow path through the injector structure at least reduces the rate at which constituents from the product form deposits on the surfaces which define the product flow path. In the case of some products to be treated, the deposition of constituents from the product being treated may be eliminated entirely. This reduction of deposits from constituents in the product being treated allows the injector to operate for longer periods before cleaning is required or desirable. The use of cooling for the product flow path second surface, that is, the surface opposite to the wall which separates the product flow path from the heating medium flow path, may also allow an injector according to the invention to be used for heat treating products which could not previously be heat treated. Such products encompass products which include raw meat or egg proteins, that is, proteins which have not been denatured by cooking, and particularly raw fibrous meat or egg proteins. Direct heating medium injectors and heating medium injection methods according to the present invention may thus be used, for example, to pasteurize materials including raw meat proteins and egg proteins which remain undenatured in the course of pasteurization. As used herein, "meat protein" includes proteins derived from the meat of any animal including, mammals, fish and other seafoods, and birds. As used herein, "egg protein" includes proteins derived from chicken and similar eggs. Beyond the application to the pasteurization of raw meat proteins and egg proteins, aspects of the present invention have application in heat treating many types of products for many purposes.

Where a surface of a given flow path is in substantial thermal communication with a cooling structure to reduce or eliminate deposition of product constituents along the flow path, the cooling structure employed may comprise any suitable arrangement which is capable of removing heat from the surface so as to reduce the temperature of the surface to the desired operating temperature. Suitable cooling structures include coolant circulating chambers through which a suitable coolant fluid may be circulated. Alternatively, thermoelectric devices located along the wall defining the respective surface to be cooled may be used to effect the desired cooling in some cases. Forced air and other cooling arrangements may also be employed as cooling structures according to the present invention as will be discussed further below in connection with the example embodiments. In the case of any cooling structure in accordance with the present invention, the cooling structure is isolated from flow paths within the injector so that there is no mass transfer from the cooling structure to the flow paths. For example, in the case of coolant circulating chambers, the chambers are not in fluid communication with the flow paths which would allow the coolant material to make direct contact with and mix with the materials in the product flow path.

As used in this description of the invention and the following claims, in "substantial thermal communication" with a surface of a flow path means in thermal contact with the surface across one or more heat conductive materials so as to facilitate the transfer of heat in a direction from the surface away from the flow path across the one or more heat conductive materials to effect reasonable control of the temperature of the surface. For example, a cooling structure such as a coolant circulating chamber separated from a given surface by a wall of material 0.25 inches thick or less having a thermal conductivity of 10 W/m K would be in substantial thermal communication with the given surface. A thicker wall at this thermal conductivity could still provide substantial thermal communication within the scope of the present invention, albeit with reduced capability of providing the desired temperature control. Additional examples of structures in substantial thermal communication with a given surface will be described below in connection with the illustrated embodiments.

Where a TMOD material is used for a given surface, the surface is formed in the TMOD material. As used in this description and the following claims, "formed in" a given material or given materials means that the surface is either molded, machined, extruded, or similarly formed in or from a mass of the material, or formed by an additive manufacturing technique such as 3D printing, either with or without polishing or other treatment to achieve a desired surface smoothness.

In some implementations of an injector according to the first aspect of the invention, portions of the product flow path may be formed from TMOD material. For example, an injector structure according to the present invention may be made up of several separately formed components which connect together to form the product flow path and heating medium flow path. In these implementations, some of the components may be formed from one or more TMOD materials while others are formed from other materials and rely on cooling structures to provide cooling of product flow surfaces according to the present invention, or include no cooling structures. One particular embodiment includes a component formed from a TMOD material which defines the product inlet opening and a portion of the product flow path adjacent to the product inlet opening. This portion of the product flow path may be arcuate in shape defining an elbow which brings the product flow path into alignment with the injector axis.

In some implementations of an injector according to the first aspect of the invention, both the heating medium flow path and the product flow path in the first region comprise a respective annular flow path. The two annular flow paths may be concentrically arranged, preferably about the injector axis. In this concentric annular flow arrangement, the annular flow area of the heating medium flow path may be located on the inside with respect to the annular flow area of the product flow path or vice versa. In either case the first boundary wall between the heating medium annular flow path and the product annular flow path comprises an annular wall.

Particularly in implementations in which the heating medium flow path in the first region comprises an annular shape, the heating medium flow path may include a frustoconically shaped section adjacent to the contact location. This frustoconically shaped section reduces in diameter in a direction from a first end of the injector structure to an outlet end so that the smaller diameter end of the frustoconical shape lies at the axial coordinate of the contact location along the injector axis, or at least faces downstream of the flow paths in the injector structure. Where the heating medium flow path includes an annular, frustoconically shaped section adjacent to the contact location, the product flow path may likewise include a frustoconically shaped section adjacent to the contact location, similarly reducing in diameter in the direction from the first end of the injector structure to the outlet end.

A heating medium injector according to the first aspect of the invention may also include a mixture flow path formed within the injector structure between the contact location along the injector axis and the outlet end of the injector structure. The mixture flow path is defined at least by a mixture flow path outer surface. According to some implementations of the present invention, the mixture flow path outer surface is in substantial thermal communication with at least one mixture flow path outer surface cooling structure. In some implementations, the mixture flow path is also defined by an inner surface at least in a region adjacent to the contact location, that is, immediately downstream from the contact location in the direction of flow. This mixture flow path inner surface may by defined by a cone-shaped element positioned coaxially with the heating medium annular flow path and decreasing in diameter in a direction from the first end to the outlet end of the injector structure.

The cooling structure along the second flow surface of the product flow path may extend past the contact location to at least a portion of the mixture flow path outer surface. Thus the same cooling structure may be used in methods according to the invention to cool both the second flow surface of the product path (a surface upstream of the contact location), and at least a portion of the mixture flow path outer surface (a surface downstream of the contact location).

Injectors and injection methods according to the present invention may be used with any heating medium suitable for the desired heat treatment. A heating medium comprising steam is particularly advantageous for heat treatments in which the product is to be returned to a lower temperature after a short time at a pasteurization temperature because water condensed in the heating process may be vaporized to rapidly reduce the temperature of the product from the pasteurization temperature. However, the present invention is by no means limited to use with steam as the heating medium. Also, the invention is not limited to any particular purpose of the heat treatment. Although injectors and injection methods according to the present invention have particular application to pasteurizing foodstuffs, especially foodstuffs including raw meat or egg proteins as described above, the invention is not limited to this application. Other applications for injectors and injection methods according to the present invention include cooking foodstuffs, sterilizing foodstuffs which have already been cooked, or simultaneously cooking and sterilizing foodstuffs for example.

Other aspects of the present invention include products produced by the methods described herein. These products include in particular products containing raw meat or egg protein produced by any of the methods described herein.

These and other advantages and features of the invention will be apparent from the following description of representative embodiments, considered along with the accompanying drawings.

DESCRIPTION OF REPRESENTATIVE EMBODIMENTS

In the following description of representative embodiments FIGS. 1-4 will be used to describe three different embodiments having the same general flow path configuration. FIGS. 5-8 will be used to describe three different embodiments having an alternate flow path configuration. It should be appreciated however, that the invention is by no means limited to the two general flow path configurations used in the examples.

Figure 1:
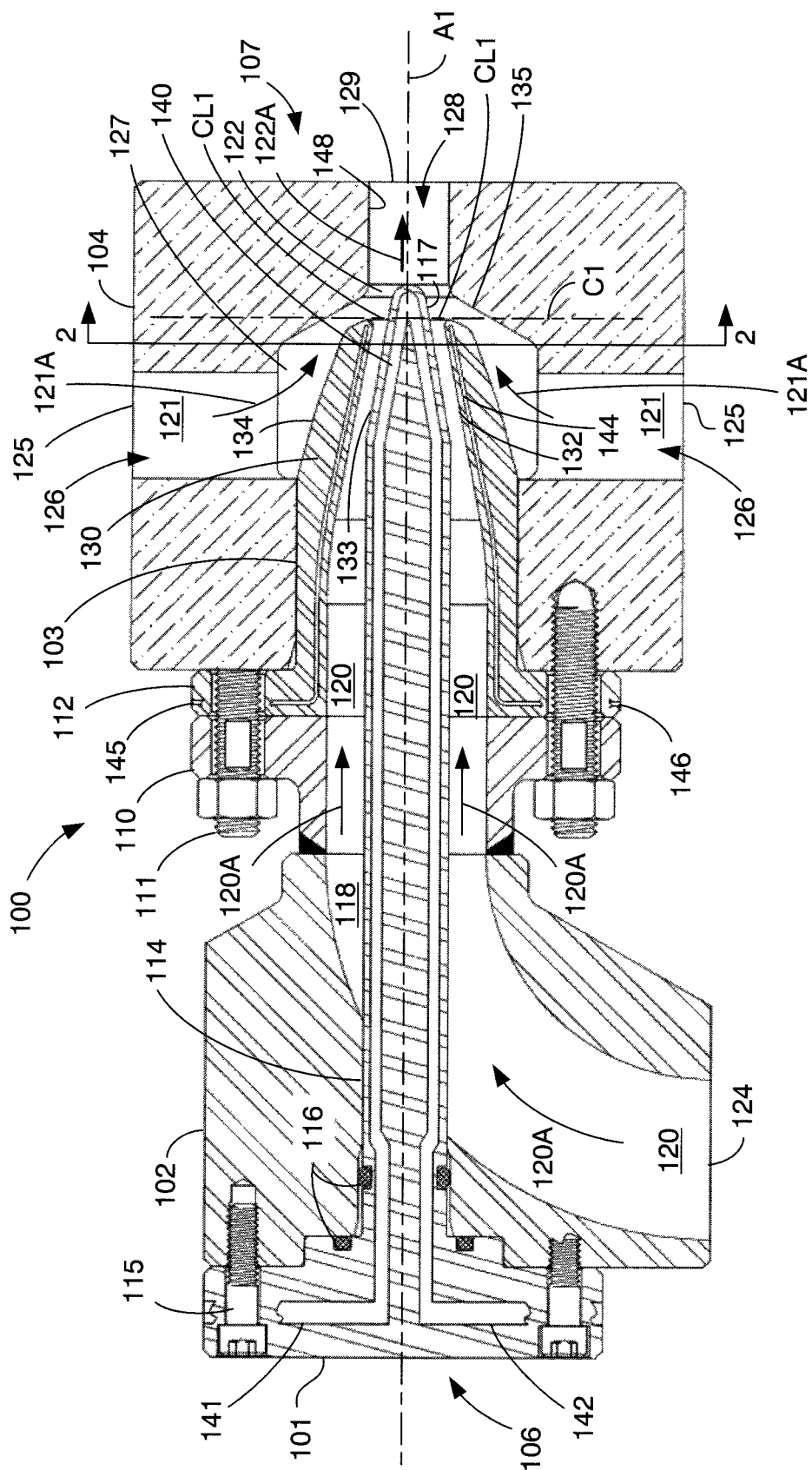
FIG. 1 is longitudinal section view of a heating medium injector embodying the principles of the invention having a first flow path configuration.

Referring to FIG. 1, a heating medium injector 100 embodying principles according to the present invention includes an injector structure made up of a center component 101, a first end component 102, an intermediate component 103, and a second end component 104. In the orientation of FIG. 1 a left end of injector 100 represents an inlet end indicated generally at 106 while the right end of the injector in FIG. 1 represents an outlet end indicated generally at 107. The combined components 101, 102, 103, and 104 are connected together along an injector axis shown in the drawing as A1.

First end component 102 is connected in example injector 100 to second end component 104 through a flange 110 and connecting bolts 111. This flange connecting arrangement also captures intermediate component 103 between first end component 102 and second end component 104 with an intermediate component flange 112 abutting first end component flange 110. Center component 101 is received through an opening 114 in first end component 102 and extends along injector axis A1 through a passage 118 defined by first end component 102 and intermediate component 103. Connecting screws 115 connect center component 101 in place on first end component 102 and seals 116 provide a liquid-tight seal between the exterior of center component 101 and opening 114.

Together, the various components define two separate flow paths through injector 100 to a contact location CL1. In this case contact location CL1 comprises an annular area defined along plane C1 extending perpendicular to injector axis A1. Contact location CL1 defines the coordinate along injector axis A1 where the two flow paths, that is, the product flow path and heating medium flow path, come together in the injector so that the materials flowing along those flow paths to the right in the orientation of the figure come together and may mix. One of these flow paths is shown in the figure at 120 while the other flow path is shown at 121. Arrows 120A indicate the direction of flow along flow path 120 and arrows 121A indicate the direct of flow along flow path 121. Injector 100 also defines an outlet or mixture flow path shown at 122, which in this example structure is defined in outlet end component 104 to the right of line C1. In this example injector 100, flow path 120 extends from an inlet opening 124 of first end component 102 through an arcuate section or "elbow" formed in the first end component and through an axial section of passage 118 that runs from the right-most part of first end component 102 through intermediate component 103 to the contact location CL1. Flow path 121 through injector 100 is defined by two inlet passages 126 formed within second end component 104 and a central chamber 127 which leads to mixture flow path 122 defined in part by an outlet passage 128 extending to an injector outlet opening 129.

Figure 2:
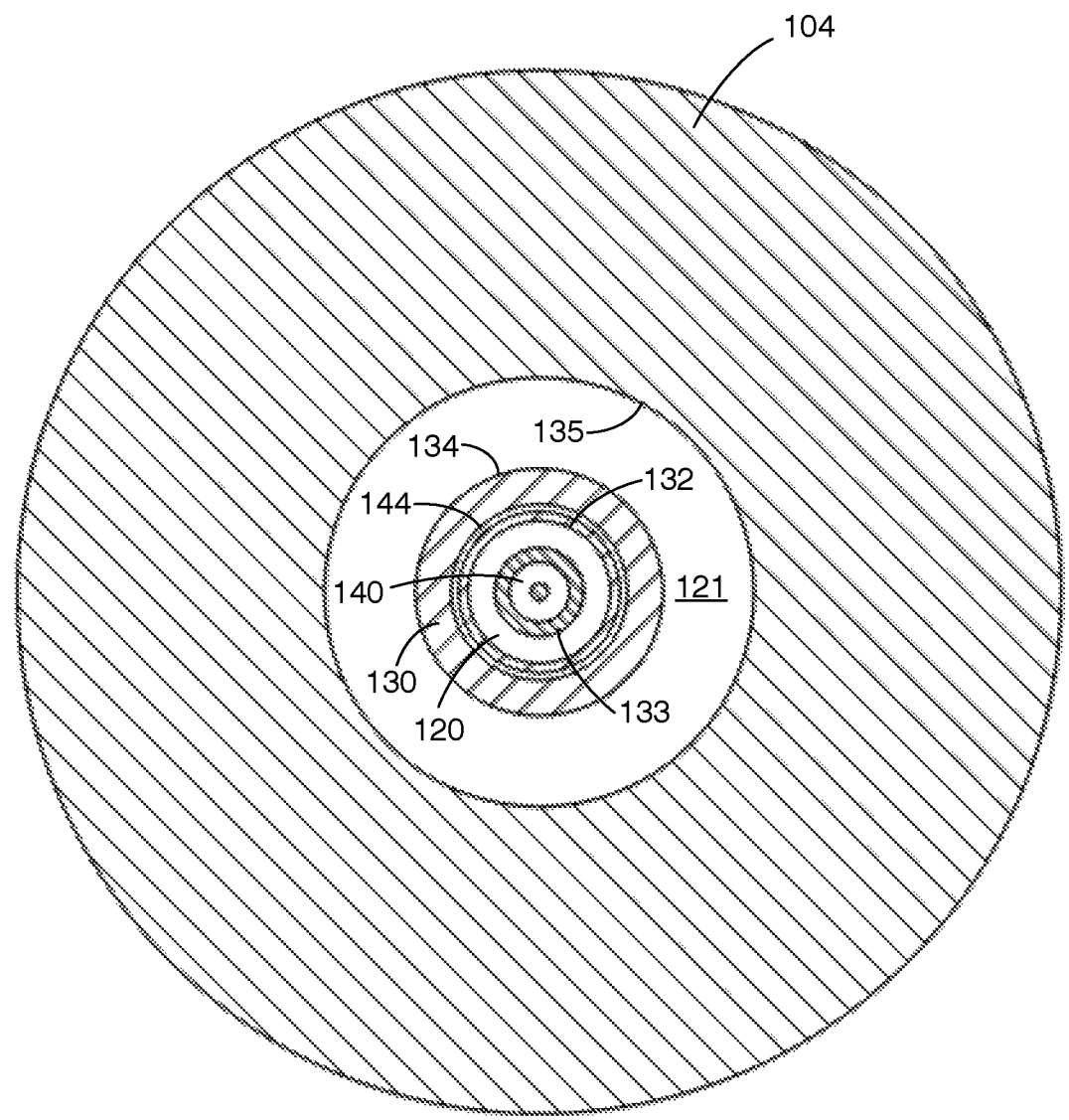
FIG. 2 is a section view taken along line 2-2 in FIG. 1.

It will be appreciated from FIG. 1 and the transverse section view of FIG. 2 that flow path 120 in the region to the right of the arcuate portion of the path comprises an annular flow path defined between a first surface 132 and second surface 133. In this example configuration, first surface 132 in the region just to the left of the contact location CL1 is defined by the inner surface of intermediate component 103. Second surface 133 is defined in this region by the exterior surface of center component 101. It should also be noted that in the configuration of FIG. 1, the flow path 121 also comprises an annular flow path defined on the inside by surface 134 and on the outside by surface 135. Surface 134 comprises an outer surface of intermediate component 103 and surface 135 comprises an inside surface of chamber 127 defined within second component 104.

Center component 101 and intermediate component 103 in FIG. 1 are formed from a material such as stainless steel which is not a TMOD material as defined for purposes of this disclosure and the following claims, while second end component 104 is formed from a TMOD material. Thus example injector 100 incorporates both cooling structures and TMOD material to reduce or eliminate product constituent deposition on surfaces within the injector. In particular, a center component cooling structure in the example of FIG. 1 comprises a coolant circulating chamber 140 at the tip of center component 101 which extends to the right in the figure past the coordinate of contact location CL1 along axis A1. This center component coolant circulating chamber 140 is connected to receive a coolant fluid through a coolant inlet passage 141 and return coolant fluid through a coolant outlet passage 142. Injector 100 also includes a cooling structure associated with intermediate component 103, namely, a coolant circulating chamber 144 extending through the intermediate component body adjacent to surface 132. This coolant circulating chamber 144 in intermediate component 103 is connected to a coolant inlet passage 145 and a coolant outlet passage 146 to facilitate circulating coolant fluid through the chamber. It should be noted that coolant circulating chambers 140 and 144, and other coolant circulating chambers disclosed herein may include baffles, dams, dividers, and other flow directing features positioned appropriately to direct the flow of coolant fluid throughout the respective chamber to provide the desired cooling across the entire adjacent surface to be cooled. These flow directing features are not shown in the drawings in order to avoid obscuring the invention in unnecessary detail. It will be appreciated by those in the field that any suitable arrangement of flow directing features may be used in a coolant circulating chamber in accordance with the present invention. Turbulence inducing devices may also be included in a coolant circulating chamber in accordance with the present invention to induce turbulence in the circulated coolant and thereby enhance the cooling effect of the coolant. It should also be noted that the relative size of the coolant circulating chambers 140 and 144 shown in FIG. 1 and particularly FIG. 2 are shown only for purposes of example and are not limiting. The relative size of the flow paths 120 and 121 and coolant circulating chambers 140 and 144 may be selected as desired or necessary to facilitate the desired flow rates, and, in the case of chambers 140 and 144, facilitate the cooling necessary to reach the desired operating temperature of the surface being cooled.

In addition to coolant circulating chambers 140 and 144, the embodiment of FIG. 1 also forms surfaces of flow path 121 and surfaces of mixture flow path 122 from a TMOD material. In this case, the entire second end component 104 is formed from a TMOD material. Thus the outer surface 135 of mixture flow path 122 is formed in a TMOD material as is the surface 148 of outlet flow passage 128.

In operation of the example injector 100 shown in FIG. 1, a product to be treated may be pumped or otherwise caused to flow into the injector through inlet opening 124 and along the flow path 120 in the direction indicated by arrows 120A toward the contact location CL1 along injector axis A1. Heating medium may be directed in through each inlet opening 125 and into each passage 126 along the flow path 121 in the direction indicated by arrows 121A to the contact location CL1. The annular flow of product and annular flow of heating medium come together at the contact location CL1 where the heating medium quickly heats the product to the desired treatment. The heated mixture comprising heated product and heating medium continue to flow through mixture path 122 in the direction of arrow 122A and out through outlet passage 128 and ultimately exits the injector through outlet opening 129 to a suitable hold tube (not shown in FIG. 1) where the product is held at the desired temperature for a desired time.

Figure 3:
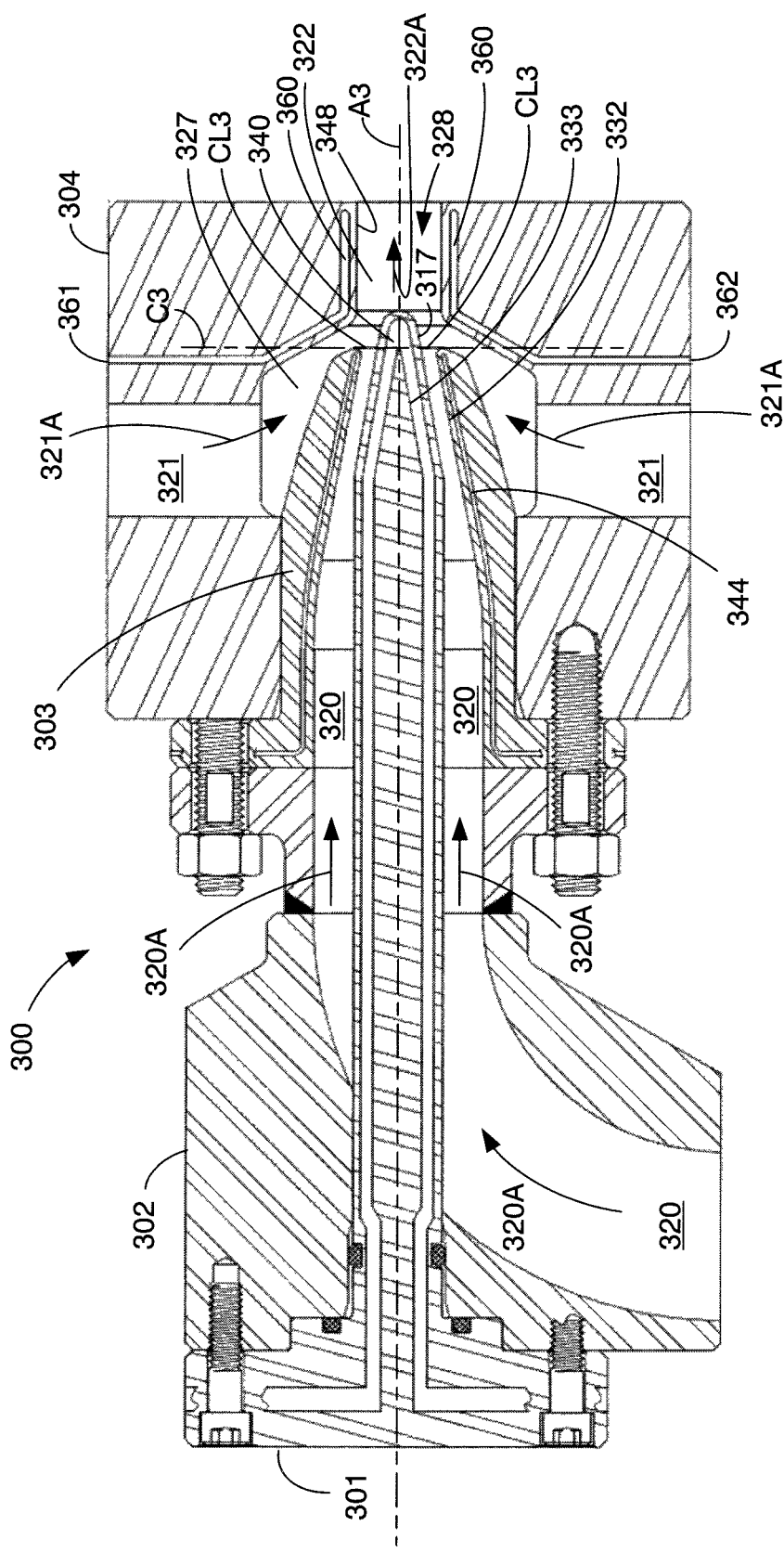
FIG. 3 is a longitudinal section view of an alternate heating medium injector embodying the principles of the invention having the first flow path configuration.

While the product to be treated is directed along the product flow path 120 in the direction indicated by arrows 120A and heating medium is directed along the heating medium flow path 121 in the direction indicated by arrows 121A, heat from the heating medium is picked up by the material of wall 130 separating the heating medium flow path from the product flow path. Heat from the injected heating medium also heats the surfaces 117 at the rightmost end of center component 101, and this heat may radiate through the material of the center component to other parts of that component including surface 133 which defines a portion of the product flow path in the region to the left of contact location CL1. In order to at least reduce the rate at which constituents from the product form deposits on surfaces 117 and 133, the operation of injector 100 also includes circulating a suitable coolant through the center component cooling chamber 140. This circulation of coolant through chamber 140 removes heat from surface 133 and 117 of center component 103 to reduce the temperature of those surfaces to temperatures below those at which the product being treated tends to adhere to a surface and thus reduce the rate at which product constituents may tend to adhere to the surfaces. In the operation of injector 100, coolant is also circulated through chamber 144 located in intermediate component 103 to remove heat from surface 132 and thereby reduce the temperature of that surface to the desired temperature and thus reduce the rate at which product constituents may tend to adhere to that surface. Meanwhile, product constituent deposition is inhibited at surfaces 135 and 148 of the second end component because those surfaces are formed in a TMOD material. In particular, the specific heat of the TMOD material or the specific heat of such material combined with the thermal conductivity of that material allow injector 100 to be operated while maintaining the temperature of the surfaces 135 and 148 below a temperature at which product may tend to adhere to those surfaces. The resistance to temperature increase provided by the TMOD material or the resistance to temperature increase combined with the conduction of heat away from the material allows the surfaces 135 and 148 to remain below the desired operating temperatures for those surfaces even though those surfaces are exposed to the heated mixture stream at a higher temperature as will be discussed further below. Although the implementation shown in FIG. 1 includes TMOD material at surfaces 135 and 148, it will be appreciated that other implementations may include cooling structures at these locations instead of TMOD materials. FIG. 3 discussed below comprises such an implementation. Cooling structures at these locations may be required for commercial operation for some types of products such as products including raw meat and egg proteins.

Surfaces 133 and 117 in FIG. 1 are in substantial thermal communication with the cooling structure comprising coolant circulating chamber 140 by virtue of the thermal conductivity of the material from which the walls defining surfaces 133 and 117 are formed (preferably but not necessarily over approximately 10 W/m K) combined with the thickness of the material between chamber 140 and surfaces 133 and 117, which may be only approximately 0.02 to approximately 0.05 inches for example. Substantial thermal communication may also be provided through a thicker wall of material. Similarly, surface 132 is in substantial thermal communication with the cooling structure comprising coolant circulating chamber 144 by virtue of the thermal conductivity of the material from which wall 130 is formed (again, preferably but not necessarily over approximately 10 W/m K) combined with the thickness of the material between chamber 144 and surface 132, which may also be approximately 0.02 to approximately 0.05 inches for example, but may be thicker for structural or other purposes. Other arrangements providing substantial thermal conductivity between a respective coolant circulating chamber such as 140 and a surface such as 133 and 117 in the example of FIG. 1, may include multiple layers of material residing between the coolant circulating chamber and surface to be cooled wall. For example, the wall of material between chamber 140 and surfaces 133 and 117 may be formed from a thin first layer of material having a first thermal conductivity, and a second layer having the same or preferably higher thermal conductivity.

In arrangements such as that shown in FIG. 1 where cooling structures are used to cool surface 133 opposite wall 130, the cooling structures need not, and preferably do not, extend along the entire length of the component 101 as indicated in the simplified drawing. Rather, the cooling structure (in this case coolant circulating chamber 140) may extend only along the length of surface 133 opposite wall 130. The coolant circulating passages 141 and 142 may extend along the component 101 closer to axis A1 and insulating materials may be included in component 101 to help reduce any cooling of product along path 120 prior to surface 133 opposite wall 130 and chamber 127.

Where cooling structures are used to cool surfaces so as to reduce deposition rates according to aspects of the present invention, the temperature to which the given surface is cooled may be a temperature below temperatures at which product tends to adhere to a surface. This temperature will vary with the product being treated. For products including raw meat or egg proteins, for example, surfaces which are cooled by a cooling structure may be cooled to a temperature preferably no more than approximately 135° F., and more preferably no more than approximately 130° F. Some products may tend to adhere to surfaces at higher temperatures than this example, while still other products may tend to adhere to surfaces at lower temperatures. The cooling structures in each case may be operated in accordance with the invention to maintain the desired operating temperature to resist the deposition of product constituents in operation of the injector according to the present invention. This operating temperature, however, need not be monitored in the operation of an injector in accordance with the invention and practice of a method in accordance with the invention. Rather, the cooling needed for a given application may be determined empirically and the process controlled to provide that empirically determined level of cooling to reduce the deposit of product constituents within the injector. It will be noted that the product flow path surfaces and heated mixture flow path surfaces formed in a TMOD material in accordance with the present invention may also be maintained below temperatures at which product tends to adhere to the surface by virtue of the properties of the TMOD material.

Operating parameters of a heating medium injector incorporating aspects of the present invention will depend in some cases on the particular product which is being treated. In particular, the treatment temperature will depend in large part upon the product being treated and the goal of the heat treatment. Where the product includes raw meat or egg proteins which are to remain undenatured over the course of the treatment, the goal of the treatment may be to destroy pathogens such as *Escherichia coli* (*E. coli*) O157:H7, *Salmonella, Listeria*, and *Campylobacter* bacteria, and in this case the target treatment temperature for the product in the heated mixture stream may be between approximately 158° F. and approximately 185° F. and the hold time at that temperature until release into the vacuum chamber may be less than one second. Of course, the present invention is by no means limited to this temperature range and hold time, which is provided merely as an example of operation.

It will be noted from the example described above for products including raw meat or egg proteins that the treatment temperature of approximately 158° F. to approximately 185° F. is well above the temperature of a surface at which the product tends to adhere to the surface, namely, approximately 135° F. for example. Thus without the surface cooling in accordance with the present invention, surfaces within a direct heating medium injector would quickly reach and exceed the adherence temperature and product deposits would quickly form. Cooling surfaces in accordance with the present invention prevents the given surfaces from reaching the adherence temperatures and thus reduce or eliminate product deposition on those surfaces. In some applications, forming surfaces in a TMOD material may likewise prevent such surfaces from reaching the adherence temperature and thus reduce or eliminate product deposition on those surfaces.

FIG. 3 shows an injector 300 having a structure similar to the structure of injector 100 in FIG. 1 and providing product, heating medium, and mixture flow paths (320, 321, and 322, respectively) similar to those shown in FIG. 1, but including a different arrangement of cooling structures. Injector 300 includes a center component 301, first end component 302, and intermediate component 303 identical to those shown in FIG. 1. However, injector 300 in FIG. 3 includes a second end component 304 that is not formed from a TMOD material. For example, second end component 304 may be formed from a stainless steel alloy suitable for food processing applications. Second end component 304 includes a cooling structure associated with an outlet passage 328 and portions of a central chamber 327 formed by the second end component. In this example the cooling structure includes a coolant circulating chamber 360 which extends in close proximity to the wall forming central chamber 327 and in close proximity to surface 348 of outlet passage 328. A coolant inlet passage 361 is connected to chamber 360 as is a coolant outlet passage 362 for allowing coolant to be circulated through chamber 360.

In the operation of injector 300 shown in FIG. 3, center component cooling chamber 340 and intermediate component cooling chamber 344 perform the same function as the corresponding chambers in injector 100. In particular, center component cooling chamber 340 cools the end surfaces 317 of center component 301 along with surface 333 of the product flow path 320 in the direction shown by arrows 320A. Intermediate coolant chamber 344 cools surface 332 of the product flow path 320. Coolant chamber 360 in the injector 300 cools surfaces 348 of outlet passage 328 and surfaces of chamber 327 particularly those past the contact location CL3 and plane C3 along axis A3 which may come in contact with product during the course of operation.

Figure 4:
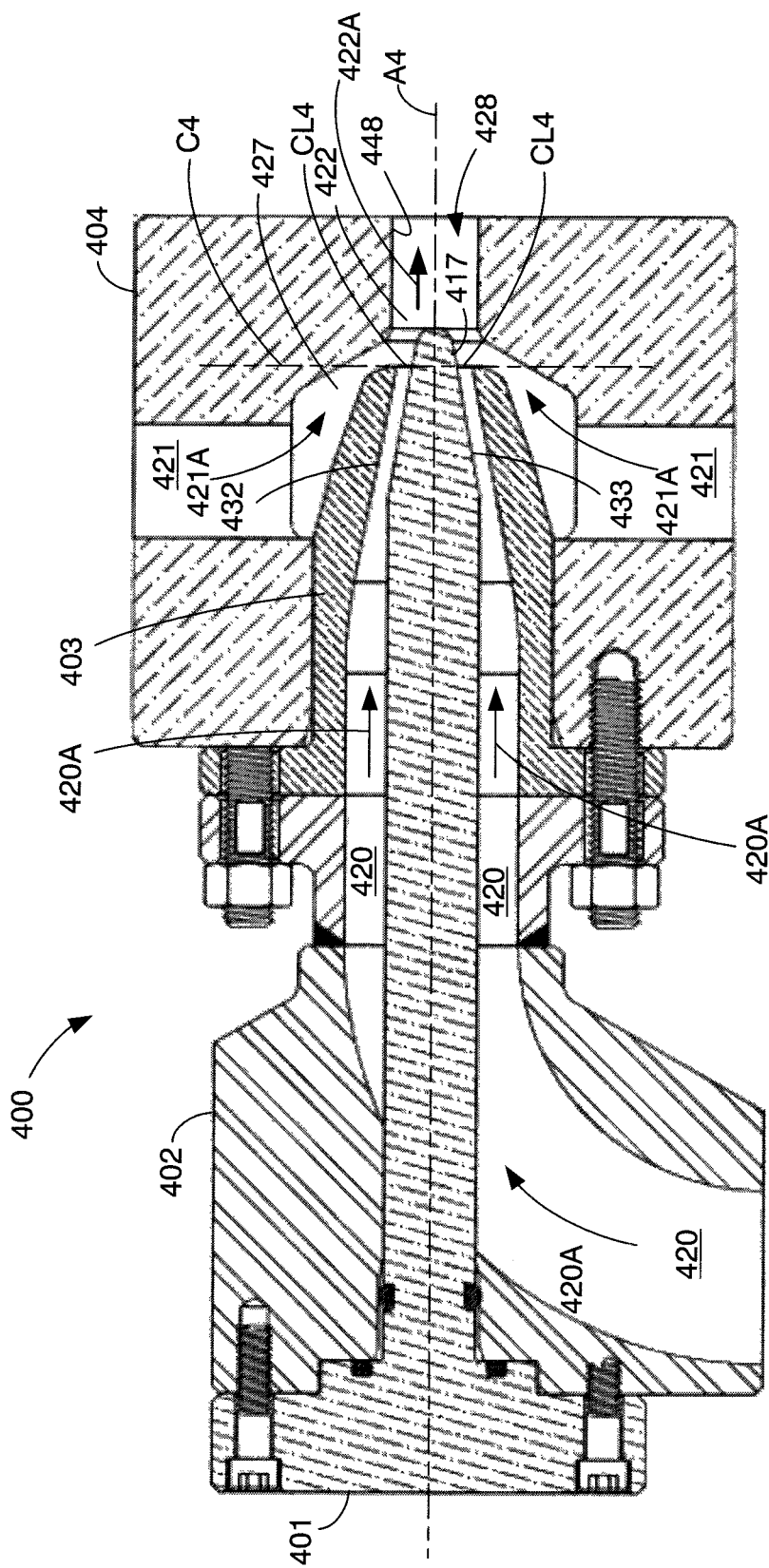
FIG. 4 is a longitudinal section view of another alternate heating medium injector having the first flow path configuration.

Injector 400 shown in FIG. 4 also has a structure similar to that shown for injector 100 in FIG. 1. Namely, injector 400 includes a center component 401, a first end component 402, an intermediate component 403, and a second end component 404. These components 401, 402, 403, and 404 are identical in external shape to the corresponding components shown in injector 100 and thus define the same configuration of product, heating medium, and mixture flow paths as those set out in FIG. 1 (labeled 420, 421, and 422 in FIG. 4). However, in the example of injector 400, the entire center component 401, and the entire intermediate component 403 are formed from a TMOD material. Second end component 404 is formed from a TMOD material similarly to second end component 104 shown in FIG. 1 for injector 100. Rather than employing coolant circulating chambers such as center component coolant circulating chamber 140 in FIG. 1 and intermediate component coolant circulating chamber 144 in FIG. 1, injector 400 employs TMOD materials to inhibit the deposition of product constituents on and surfaces 417, surfaces 433 and 432 of the product flow path, and surfaces 448 of outlet passage 428, and on surfaces of central chamber 427 downstream of the contact location CL4 along axis A4. This application of TMOD materials may be effective for treating some types of products, although not products containing raw meat or egg proteins.

It should also be noted that an injector having the configuration shown in FIGS. 1, 3, and 4 may also be operated with the flow paths for the product and the heating medium switched from that described above. In particular, and referring back to FIG. 1 for example, heating medium may be directed through the flow path 120 while product may be directed along the flow path indicated by 121. In this mode of operation, the structure may be changed so that no center component cooling structure is included or the center component cooling structure is effective for cooling only the surfaces 117 at the end of center component 101 and does not cool the surfaces of center component 101 along surface 133 opposite wall 130. Also, in the case where product is introduced into injector 100 along the flow path 121, cooling structures will be required along surfaces 135 and 148. Where intermediate component coolant circulating chamber 144 is required to cool surface 134 for a particular product, that chamber may be located in closer proximity to surface 134 than shown in FIG. 1 to provide more effective cooling to that surface.

Figure 5:
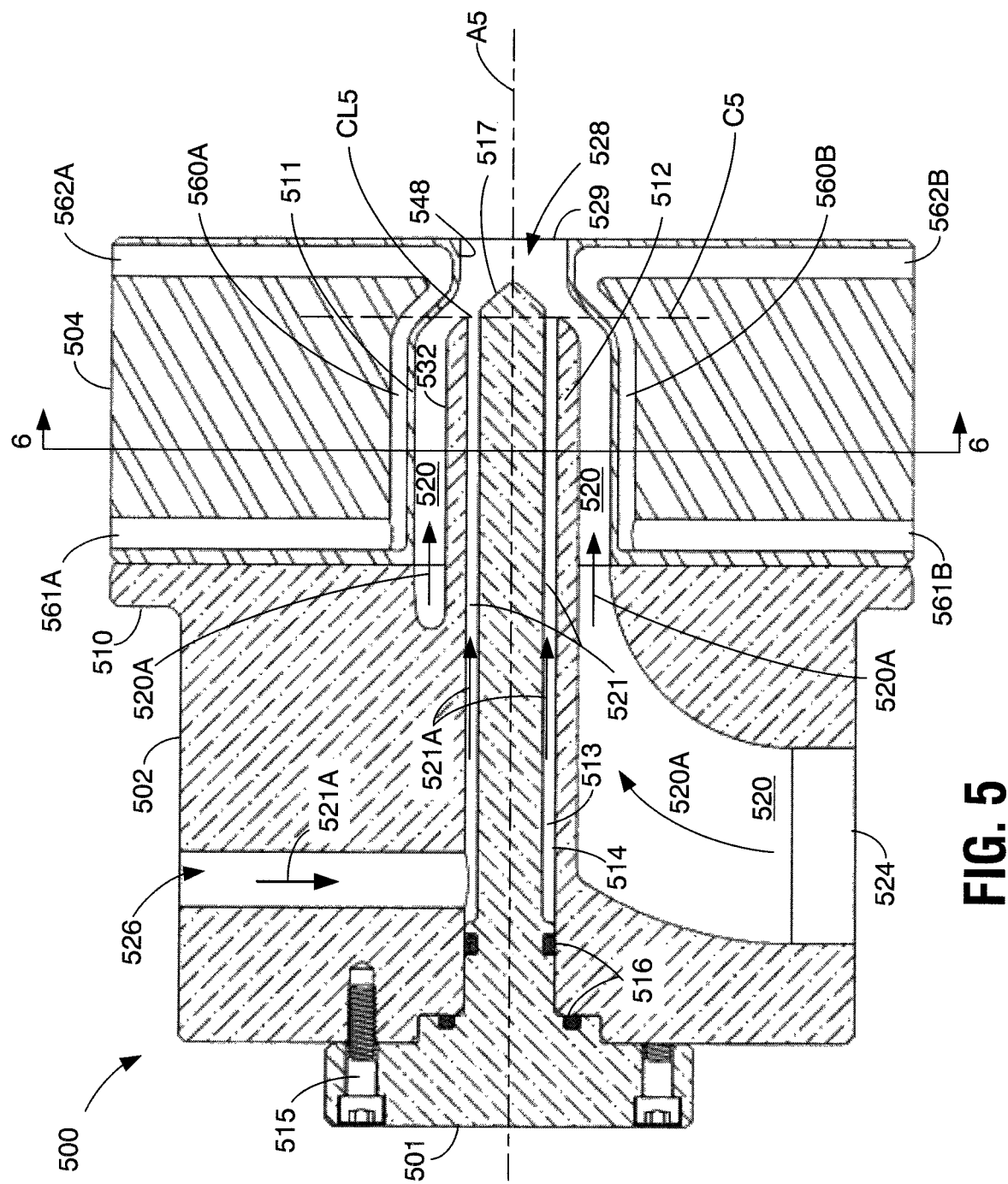
FIG. 5 is longitudinal section view of a heating medium injector embodying the principles of the invention having a second flow path configuration.
Figure 6:
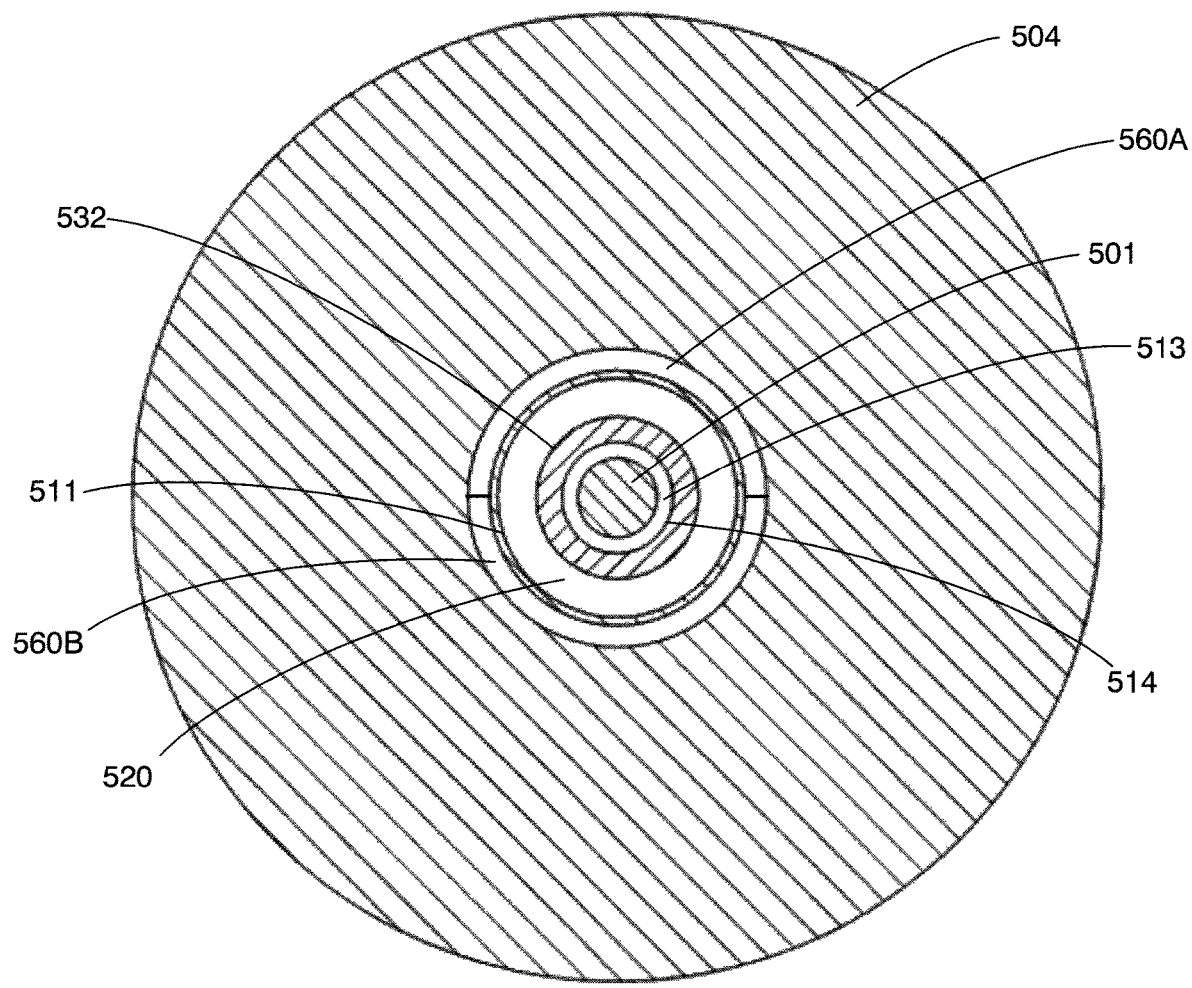
FIG. 6 is a section view taken along line 6-6 in FIG. 5.

FIG. 5 shows another injector 500 according to the principles of the invention with a somewhat different structure than injectors 100, 300, and 400. Injector 500 includes a center component 501, a first end component 502, and a second and component 504. First end component 502 includes a flange 510 that may be used together with suitable bolts (not shown) to connect to second end component 504. First end component 502 also defines a center component receiving opening 514 for receiving an elongated portion of center component 501. Center component 501 may be connected to first end component 502 through suitable bolts 515 and sealed using seals 516 similarly to manner in which center component 101 is connected in injector 100 shown in FIG. 1. Unlike the structure shown in FIG. 1, first end component 502 includes a portion 512 which protrudes so as to extend into an axial passage defined by surface 511 in second end component 504. Alternatively, this protruding portion 512 may be a separately formed part connected between components 502 and 504. When connected in the operating position shown in FIG. 5, opening 514 extends along the injector axis A5 and through the protruding portion 512 to the contact location CL5 at the intersection of line C5 and the injector axis. Opening 514 is adapted to receive the elongated portion of center component 501 but leaves a gap 513 between the outer surface of the center component and surface of opening 514. This gap 513 defines a portion of a flow path through injector 500 which is indicated in FIG. 5 at 521, with the remainder of the flow path defined by inlet passage 526 in first end component 502. The second flow path defined through injector 500 comprises flow path 520 which extends from an inlet opening 524 in first end component 502, through an elbow section in that component, and into an annular area defined between surface 532 of protruding part 512 and surfaces 511 of second end component 504. This annular flow path extends to an outlet passage 528 which comprises a mixture flow path leading to outlet opening 529 and defines outlet passage surfaces 548 in second end component 504. The annular shape of the flow path defined between surfaces 511 and 532 (comprising a portion of flow the flow path 520 in FIG. 5) is apparent especially from the transverse section view of FIG. 6. FIG. 6 additionally shows that the flow path defined by surfaces of opening 514 and the exterior of center component 501 (the flow path shown rows 521 in FIG. 5) also defines an annular flow path.

In the example of injector 500, the entire first end component 502 is formed from a TMOD material as is the entire center component 501. Second end component 504 is formed from a suitable food processing grade material which is not a TMOD material in this example structure such as a suitable stainless steel. In accordance with aspects of the present invention, a cooling structure is included in second end component 504. In the example of injector 500, this cooling structure comprises two separate coolant circulating chambers 560A and 560B which each extend over a different part of the axial opening defined by surfaces 511 and of the outlet passage 528, and each include a respective coolant inlet 561A, 561B and coolant outlet 562A and 562B. Surprisingly, implementations of an injector having a configuration similar to that shown in FIG. 5 in which the protruding part 512 is formed from stainless steel (that is, not a TMOD material) allow treatment of products containing raw meat proteins to temperatures of between approximately 158° F. and approximately 185° F. without significant product constituent deposition on surfaces corresponding to surfaces 532 in FIG. 5.

In a preferred manner of operating injector 500, heating medium is injected through inlet 526 in first end component 502 and directed along the flow path 521 in the direction indicated by arrows 521A in FIG. 5, which comprises an annular flow path between surfaces of opening 514 and the elongated part of 501 (gap 513). Also in this preferred mode of operation, product to be treated is directed into the injector through inlet opening 524 and along the flow path 520 in the direction indicated by arrows 520A including through the arcuate section and into the annular flow area defined between surfaces 511 and 532. The heating medium and product come together at the contact location CL5 and the mixture then flows to the right in the orientation of FIG. 5 through outlet passage 528 and ultimately out of the injector through outlet opening 529. As heating medium and product are so directed through injector 500, a suitable coolant is circulated through coolant chambers 560A and 560B which together envelope the wall of material defining the entire surface 511. This circulation of coolant cools surface 511 to the desired temperature or desired operational effectiveness for reducing product deposits for the given product and thereby inhibits the deposition of constituents from the product on those surfaces in accordance with the present invention. The TMOD material in which surface 532 is formed at the inside diameter of the annular product flow path 520 inhibits the deposition of product constituents on that surface. Additionally, the TMOD material in which surfaces 517 are formed downstream from contact location CL5 along injector axis A5 inhibits the deposition of product on those surfaces. It is noted that in this injector configuration according to the present invention, the coolant circulating chambers 560A and 560B each extend along a portion of the product flow path 520, and then traverse the line C5 and thus also extend along the mixture flow path defined by passage 528. Thus the same cooling arrangement provides the desired cooling and deposition inhibiting both upstream and downstream from contact location CL5 along injector axis A5.

An injector having the product and heating medium flow path arrangement shown in FIG. 5, may include a variation in which the material forming surface 532 is not formed from a TMOD material and is not cooled in operation. In this variation, the material forming surface 532 along some or all of the length of the surface may be formed from stainless steel. This variation relies on cooling only along surface 511 to reduce product constituent deposition along surface 511 and 532. Other variations on injector 500 may include forming component 501 of stainless steel or other materials which are not represent TMOD materials.

Figure 7:
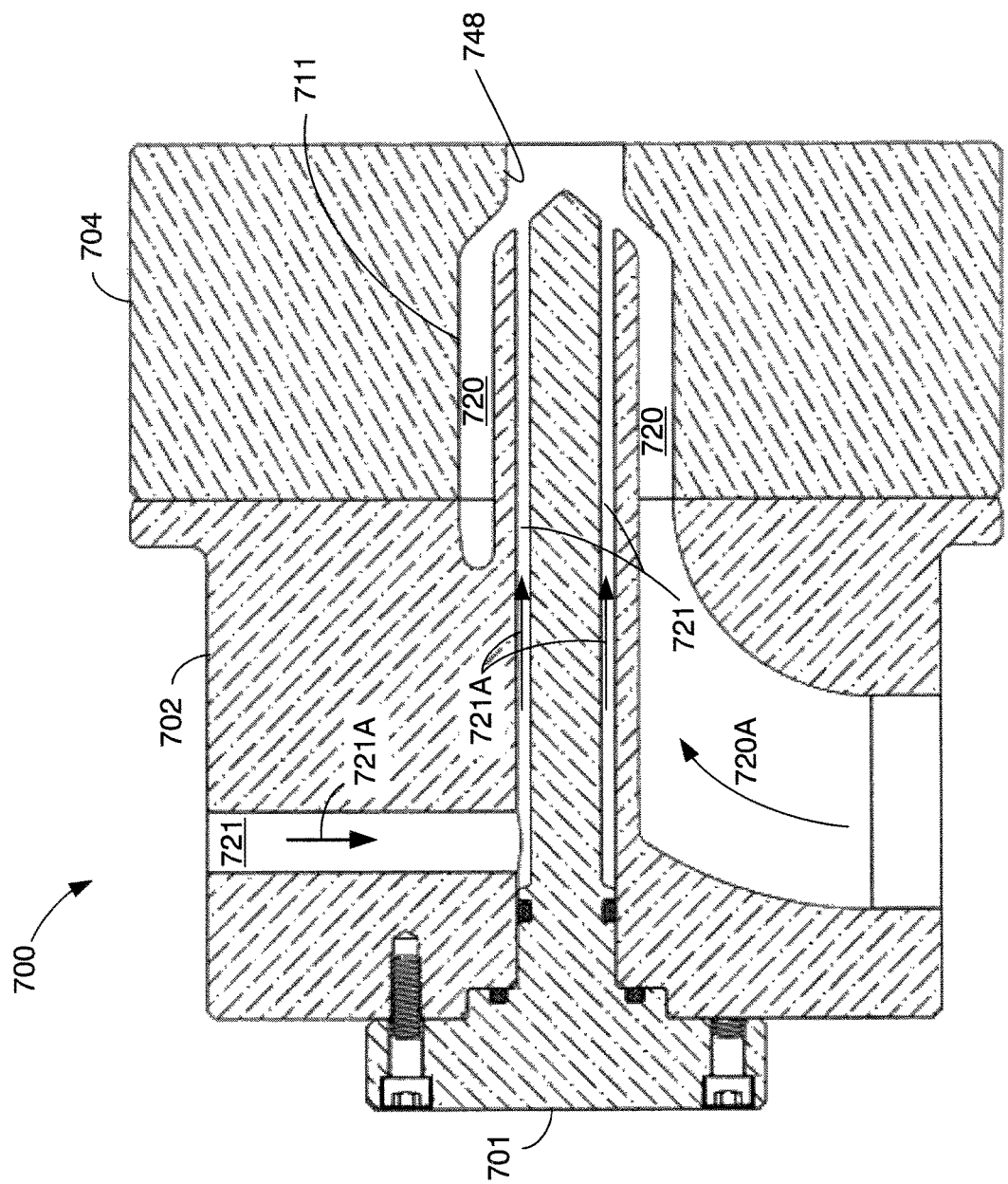
FIG. 7 is a longitudinal section view of an alternate heating medium injector having the second flow path configuration.

The injector 700 shown in FIG. 7 comprises a structure similar to that shown for injector 500 in FIG. 5. In particular, injector 700 includes a center component 701, a first end component 702, and a second end component 704. Injector 700 also includes a flow path 720 through which product may be directed in the direction indicated by arrows 720A, and a flow path 721 through which heating medium may be directed in the direction indicated by arrows 721A. Injector 700 differs from injector 500 in that second end component 704 comprises a TMOD material. Thus no cooling structure is located along surfaces 711 and 748 formed in second end component 704. Although injector 700 may be effective for reducing the rate of product deposition for some products, the arrangement relying entirely on TMOD materials is not suitable for use in treating products containing raw meat proteins or raw egg proteins.

Figure 8:
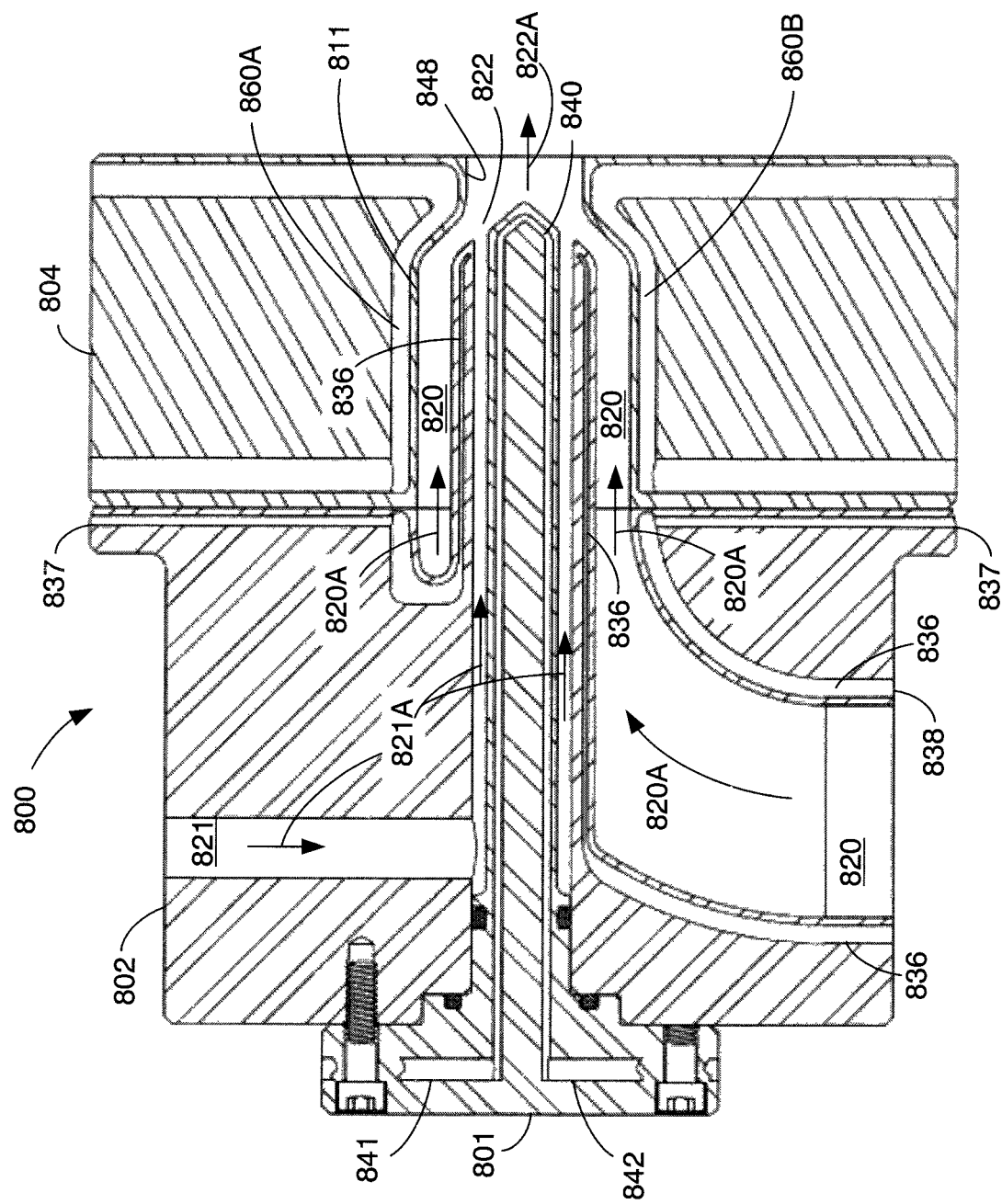
FIG. 8 is a longitudinal section view of another alternate heating medium injector embodying the principles of the invention having the second flow path configuration.

Injector 800 shown in FIG. 8 has a configuration of components similar to injector 500 shown in FIG. 1, including a center component 801, a first end component 802, and a second end component 804. Second end component 804 in injector 800 is similar to the corresponding component 504 in FIG. 5 in that it is not formed from a TMOD material, but from a suitable material such as stainless steel. Thus second end component 804 includes a cooling structure comprising coolant circulating chambers 860A and 860B for cooling surface 811 and surface 848. Unlike the corresponding components in injector 500 shown FIG. 5, center component 801 and first end component 802 in injector 800 are also formed from a material such as a suitable stainless steel that is not a TMOD material. In view of the material from which these components 801 and 802 are formed, each also includes a cooling structure for cooling the desired surfaces. In particular center component 801 includes a cooling structure comprising a coolant circulating chamber 840 at the right-hand end of the center component in the orientation of the figure. Coolant circulating chamber 840 is connected to a coolant inlet 841 and a coolant outlet 842 to facilitate circulation of the coolant material. First end component 802 includes a cooling structure comprising a respective coolant circulating chamber 836 adjacent to all of the surfaces forming the flow path 820. This chamber 836 is associated with a coolant inlet 837 and coolant outlet 838 to facilitate circulating the desired coolant material.

In operation of injector 800 shown in FIG. 8, product is directed along the flow path 820 in the direction indicated by arrows 820A, heating medium is directed along the flow path 821 in the direction indicated by arrows 821A, and the mixture is directed along the mixture flow path 822 in the direction indicated by arrow 822A. A suitable coolant is simultaneously circulated through each of the chambers 840, 836, 860A, and 860B to cool the surfaces adjacent to the respective chambers and thereby inhibit the deposition of constituents from the product on the adjacent flow path surfaces.

As with the injector structure shown in FIGS. 1, 3, and 4, the injector structure shown in FIGS. 5, 7, and 8 may be operated with the flow paths for the heating medium and product switched. That is, in injector 500 for example, product may be directed along the flow path 521 in the direction indicated by arrows 521A and heating medium may be directed along flow path 520 in the direction indicated by arrows 520A. In this manner of operation, it is necessary to include cooling structures to cool the surfaces of component 501 along at least a portion of the product flow path 521 which overlaps with the flow path 520. In the case of injector 700, no modifications of the structure are necessary in order to direct heating medium along the flow path 720 in the direction indicated by arrows 720A and direct product along flow path 721 in the direction indicated by arrows 721A, although it should be noted again that this arrangement would not be suitable for some products, particularly, products containing raw meat proteins or containing raw egg proteins.

It will be appreciated that in order to direct product and heating medium into injector 100 and to facilitate the flow of mixed product and heating medium from the injector, suitable connecting structures such as flanges, compression fittings, or other connectors will be provided at the various inlet openings such as openings 124 and 125 in FIG. 1, and each outlet opening such as outlet opening 129 in FIG. 1. Suitable connecting fittings or devices are also necessary for the coolant circulating openings such as coolant inlets 561A and 561B and coolant outlets 562A and 562B in FIG. 5. Since any number of different types of connecting structures may be used, and since such connecting structures are well known in the art, these connecting structures are omitted from the drawings so as not to obscure the invention in unnecessary detail.

In the injector configuration shown in FIGS. 1, 3, and 4 and the configuration shown in FIGS. 5, 7, and 8, the respective center component (101 in FIGS. 1 and 501 in FIG. 5 for example), is adjustable along the respective injector axis (A1 in FIG. 1 and A5 in FIG. 5 for example). Referring to FIG. 5 for example, center component 501 is in its right-most position in the orientation of the figure. Appropriate spacers between component 501 and component 502 at the left end of component 501 in the figure can be used to adjust the position of component 501 to the left so that plane C5 intersects the cone-shaped surface 517. This has the effect of increasing the area of the annulus defining the contact location CL5. A similar adjustment may be made in the configuration shown in FIGS. 1, 3, and 4. Other implementations may include adjusting mechanisms for the center component which do not rely on spacers and which facilitate adjustments of the center component position and contact location area during operation of the injector.

Figure 9:
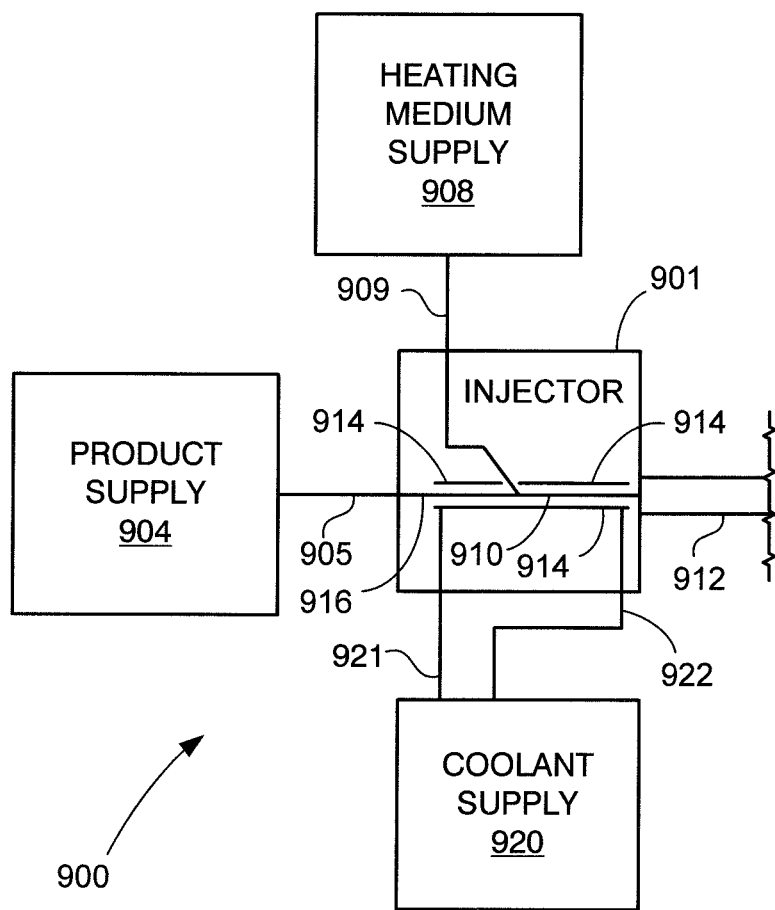
FIG. 9 is a schematic representation of a heating medium injection system including a heating medium injector in accordance with the present invention.

The schematic diagram of FIG. 9 shows a portion of a direct heating medium injection treatment system 900 in which an injector according to various aspects of the present invention may be used. In the illustrated system, heating medium injector 901 is connected to receive product to be treated from a product supply 904 through a product supply line 905. Heating medium injector 901 is also connected to receive heating medium from heating medium supply 908 through a heating medium supply line 909. A mixture flow path is shown at 910 in FIG. 9, and is shown connected to a hold tube structure 912. A hold tube structure suitable for use as hold tube structure 912 is disclosed in U.S. Provisional Patent Application No. 62/808,778 filed Feb. 21, 2019, and entitled "Direct Heating Medium Injector and Injection System and Method," the entire content of which is incorporated herein.

The illustrated injector 901 utilizes a cooling structure or cooling structures to cool surfaces of the product flow path and mixture flow path in the injector. These cooling structures are represented in FIG. 9 as lines 914 extending along portions of the product flow path 916 and along portions of mixture flow path 910, and in this example comprise coolant circulating chambers through which a suitable coolant fluid may be circulated to provide the desired cooling. Coolant fluid is directed through the cooling structures 914 from a coolant supply 920 connected to the cooling structures by a coolant inlet line 921 and a coolant return line 922.

In operation of the system shown in FIG. 9, product is directed from product supply 904 through the product flow path 916 in injector 901 simultaneously as heating medium is directed through the injector at rates and in a proportion to achieve the desired temperature of the product in the hold tube structure 912 for the desired treatment time. As the product and heating medium are so directed, coolant fluid is directed through the coolant circulating chambers 914 at a temperature and rate to provide the desired cooling at the product and mixture flow path surfaces on injector 901.

Although FIG. 9 shows a coolant structure arrangement for cooling certain surfaces of the product flow path 916 and mixture flow path, it will be appreciated from the previous discussion that implementations of the present invention are not limited to this arrangement. Rather, cooling structures such as coolant circulating chambers may be included only for portions of the product flow path and portions of the mixture flow path, or a single coolant circulating chamber may be included for some portion of the product flow path and/or mixture flow path. In these implementations a coolant supply such as 920 in FIG. 9 may be used together with suitable connecting conduits to circulate the coolant fluid. In other implementations multiple coolant supplies may be used to supply coolant fluid to the different coolant circulating chambers.

The invention encompasses numerous variations on the above-described example systems. Such variations include variations related to the cooling structures described in the above examples. Generally, where a cooling structure is employed to remove heat from a surface forming part of a mixture flow path, the cooling structure may include any number of segments or elements to accomplish the desired cooling. For example, any number of separate or connected coolant circulating chambers may be included for a given surface. Also, although the illustrated examples assume a certain direction of circulation through the coolant circulation chambers, the direction of circulation may be reversed from that described. Furthermore, the invention is not limited to cooling structures comprising coolant circulating chambers to provide the desired cooling. Thermoelectric devices may also be used to provide the desired cooling of a given surface according to the present invention, as may forced air cooling arrangements in which air is forced over fins or other heat conductive arrangements in substantial thermal communication with the surface to be cooled. A cooling structure within the scope of the invention may also employ evaporative cooling to remove heat from the desired flow path surfaces. Also, different types of cooling structures may be used for different areas of a given surface to be cooled.

For a given portion of a product flow path or mixture flow path, a cooling structure may be immediately adjacent to the surface to be cooled. However, cooling structures such as coolant circulating chambers may not be continuous, but may include dividers, baffles, turbulence inducing features, and other structures which prevent the coolant circulating chamber from being continuous along a given surface. Such arrangements in which the coolant circulating chamber may not be continuous over a given surface to be cooled remain within the scope of the present invention as set out in the claims.

Surfaces which come in contact with the product and the mixture of heated product and heating medium should have at least a suitable finish appropriate for the given product being treated in accordance with food (or other material) handling standards. Generally, the surface roughness of any surface forming a portion of the mixture flow path should have a value of 32 RA microinches or less. Lower surface roughness values may enhance the deposition inhibiting performance of a cooled surface or surface formed in a TMOD material in accordance with the invention.

As noted above, a TMOD material comprises a material having a specific heat of no less than approximately 750 J/kg K, and preferably no less than approximately 900 J/kg K, and, more preferably, no less than approximately 1000 J/kg K. Of course, where the product being treated is a foodstuff or pharmaceutical, a TMOD material must also be suitable for providing food contact surfaces. A class of materials particularly suited for use as a TMOD material in accordance with the present invention comprises plastics which have a specific heat of no less than approximately 1000 J/kg K and are suitable for providing food contact surfaces, retain structural integrity, maintain dimensional stability, and do not degrade at temperatures which may be encountered in a steam injection system. These plastics include polyetheretherketone (PEEK), Nylon, Ultra-high-molecular-weight polyethylene (UHMWPE), polytetrafluoroethylene (Teflon), polyoxymethylene (POM or Acetal), and poly methyl methacrylate (acrylic), for example. These plastics suitable for use as TMOD material in accordance with the present invention may include various additives and may be used in both an unfilled composition or a filled (composite) composition, such as glass-filled or carbon-filled, provided the filled material remains suitable for food contact, retains the desired specific heat as described above in this paragraph and is capable of providing the desired surface finish. Materials other than plastics may also be employed for TMOD material within the scope of the present invention. These materials include ceramics such as porcelain, glasses such as borosilicate glass (Pyrex), and rubber. These materials also include aluminum which has a specific heat of approximately 900 J/kg K and a thermal conductivity of approximately 240 W/m K, as well as magnesium and beryllium and alloys of these materials and Albemet. Materials having a specific heat of somewhat less than approximately 750 J/kg K but exhibit relatively high thermal conductivity may also represent a suitable substitute for a TMOD material. Such materials may have a specific heat of no less than approximately 650 J/kg K and a thermal conductivity of no less than approximately 100 W/m K and include silicon carbide for example. Also, a TMOD material within the scope of the present invention may comprise a mixture of materials and need not comprise a single material. For example, a TMOD material may comprise a mixture of different types of thermoplastics, or plastics and other materials such as quartz and epoxy resin composite materials for example, or may be made up of layers of metals, plastics, and other materials and combinations of such materials in different layers. A TMOD material also need not be continuous along a given surface. For example, a give surface formed in a TMOD material according to the present invention may be formed in PEEK over a portion of its length and may be formed in a different plastic or other TMOD material over another portion of its length.

It should also be noted that although the example TMOD components shown in the drawings indicate that the entire component is formed from TMOD material, embodiments of the present invention are not limited to components formed entirely of TMOD material. In some implementations for example, a component defining a portion of the product path surfaces or of the mixture path surfaces may comprise an inner sleeve in which the flow path surface is formed. This inner sleeve may be mounted in or connected to an outer housing that is not formed from a TMOD material, but provided for some purpose unrelated to the TMOD function such as to facilitate assembly of the system or to provide structural support.

It is also possible in accordance with the present invention to utilize cooling structures together with TMOD materials. Although not limited to such materials, this use of cooling structures is particularly applicable to TMOD materials such as aluminum having high thermal conductivity. In any event, the limitations as set out in the following claims that a given surface is in substantial thermal communication with a cooling structure is not intended to exclude the combination of those two features. A given surface may be both formed in a TMOD material and be in substantial thermal communication with a cooling structure according to the following claims.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, and the like with reference to a given feature are intended only to identify a given feature and distinguish that feature from other features. Unless specifically stated otherwise, such terms are not intended to convey any spatial or temporal relationship for the feature relative to any other feature.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A heating medium injector including:
    (a) an injector structure extending along an injector axis from a first end to an outlet end;
    (b) a heating medium flow path defined within the injector structure, the heating medium flow path extending from a heating medium inlet opening to a contact location;
    (c) a product flow path defined within the injector structure, the product flow path extending from a product inlet opening to the contact location, the product flow path in a first region being defined between a first flow surface and a second flow surface, the first flow surface comprising a surface of a first boundary wall separating the heating medium flow path from the product flow path in the first region and the second flow surface comprising a surface of a second boundary wall;
    (d) the contact location comprising a location within the injector structure at which the heating medium flow path and product flow path first merge in a direction from the first end of the injector structure to the outlet end of the injector structure; and
    (e) at least some of the second flow surface of the product flow path is in substantial thermal communication with a second flow surface cooling structure formed within or connected to the second boundary wall and isolated from the product flow path.

2. The heating medium injector of claim 1 wherein the second flow surface cooling structure comprises a coolant circulating chamber connected to a coolant inlet at an exterior of the injector structure and to a coolant outlet at the exterior of the injector structure.

3. The heating medium injector of claim 1:
    (a) further including a mixture flow path formed within the injector structure between the contact location along the injector axis and the outlet end of the injector structure;
    (b) wherein a first region of the mixture flow path adjacent to the contact location is defined at least in part by a mixture flow path outer surface; and
    (c) wherein the mixture flow path outer surface is in substantial thermal communication with a mixture flow path outer surface cooling structure which is isolated from the mixture flow path.

4. The heating medium injector of claim 3 wherein the mixture flow path outer surface cooling structure comprises a coolant circulating chamber connected to a coolant inlet at an exterior of the injector structure and to a coolant outlet at the exterior of the injector structure.

5. The heating medium injector of claim 1:
    (a) further including a mixture flow path formed within the injector structure between the contact location along the injector axis and the outlet end of the injector structure;

(b) wherein the mixture flow path is defined at least in part by a mixture flow path outer surface; and (c) wherein the second flow surface cooling structure traverses a plane of the contact location so as to extend along at least a portion of the second flow surface of the product flow path and at least a portion of the mixture flow path outer surface, and wherein the second flow surface cooling structure is also isolated from the mixture flow path.

6. The heating medium injector of claim 5 wherein the second flow surface cooling structure comprises a coolant circulating chamber connected to a coolant inlet at an exterior of the injector structure and to a coolant outlet at the exterior of the injector structure.

7. The heating medium injector of claim 1 wherein:
(a) the heating medium flow path in the first region comprises a heating medium annular flow path; and
(b) the product flow path in the first region comprises a product annular flow path that is coaxial with the heating medium annular flow path such that the first boundary wall comprises an annular wall between the heating medium annular flow path and the product annular flow path.

8. The heating medium injector of claim 7:
(a) further including a mixture flow path formed within the injector structure between the contact location along the injector axis and the outlet end of the injector structure;
(b) wherein a first region of the mixture flow path adjacent to the contact location is defined between a mixture flow path outer surface and a mixture flow path inner surface, the mixture flow path inner surface being defined by a cone-shaped element positioned coaxially with the heating medium annular flow path and decreasing in diameter in the direction from the first end of the injector structure to the outlet end of the injector structure; and
(c) wherein the mixture flow path outer surface is in substantial thermal communication with a mixture flow path outer surface cooling structure which is isolated from the mixture flow path.

9. The heating medium injector of claim 8 wherein the product flow path includes a frustoconically shaped section adjacent to the contact location and reduces in diameter in the direction from the first end of the injector structure to the outlet end of the injector structure.

10. The heating medium injector of claim 9 wherein:
(a) the second flow surface cooling structure comprises a second flow surface coolant circulating chamber; and
(b) the mixture flow path outer surface cooling structure comprises a mixture flow path outer surface coolant circulating chamber.

11. The heating medium injector of claim 10 wherein the second flow surface coolant circulating chamber is in fluid communication with the mixture flow path outer surface coolant circulating chamber.

12. A method for injecting a heating medium into a product, the method including:
(a) directing the heating medium in a heating medium flow path from a heating medium inlet to a contact location spaced apart from the heating medium inlet along an injector axis;
(b) directing a product to be treated in a product flow path from a product inlet to the contact location which is spaced apart from the product inlet along the injector axis, the product flow path in a first region along the injector axis being defined between a first flow surface and a second flow surface, the first flow surface comprising a surface of a first boundary wall separating the heating medium flow path from the product flow path and the second flow surface comprising a surface of a second boundary wall; and (c) while directing the heating medium in the heating medium flow path and directing the product in the product flow path, cooling at least some of the second flow surface through a second flow surface cooling structure isolated from the product flow path.

13. The method of claim 12 wherein the second flow surface cooling structure includes a second flow surface coolant circulating chamber located adjacent to second flow surface and cooling the at least some of the second flow surface includes circulating a second flow surface coolant fluid through the second flow surface coolant circulating chamber.

14. The method of claim 12:
(a) further including directing a mixture of the heating medium and the product to be treated through a mixture flow path extending between the contact location and an injector outlet;
(b) wherein a first region of the mixture flow path adjacent to the contact location is defined at least in part by a mixture flow path outer surface; and
(c) cooling the mixture flow path outer surface through a mixture flow path cooling structure located adjacent to the mixture flow path outer surface and isolated from the mixture flow path.

15. The method of claim 12:
(a) further including directing a mixture of the heating medium and the product to be treated through a mixture flow path extending between the contact location and an injector outlet;
(b) wherein a first region of the mixture flow path adjacent to the contact location is defined at least in part by a mixture flow path outer surface;
(c) wherein the second flow surface cooling structure includes a contact location coolant circulating chamber adjacent to at least some of the second flow surface and to at least some of the mixture flow path outer surface and cooling the at least some of the second flow surface includes circulating a coolant fluid through the contact location coolant circulating chamber; and
(d) cooling the mixture flow path outer surface includes circulating the coolant fluid through the contact location coolant circulating chamber.

16. The method of claim 12 wherein:
(a) directing the heating medium in the heating medium flow path includes directing the heating medium in a heating medium annular flow path in the first region; and
(b) directing the product in the product flow path includes directing the product in a product annular flow path that is coaxial with the heating medium annular flow path such that the first boundary wall comprises an annular wall between the heating medium annular flow path and the product annular flow path.

17. The method of claim 16:
(a) further including directing a mixture of the heating medium and the product to be treated through a mixture flow path extending between the contact location and an injector outlet opening;
(b) wherein a first region of the mixture flow path adjacent to the contact location is defined between a mixture flow path outer surface and a mixture flow path inner surface, the mixture flow path inner surface being defined by a cone-shaped element positioned coaxially with the heating medium annular flow path and decreasing in diameter in a direction from the contact location to the injector outlet opening;

(c) wherein the mixture flow path outer surface is in substantial thermal communication with a mixture flow path outer surface cooling structure extending along the mixture flow path and isolated from the mixture flow path; and (d) cooling at least some of the mixture flow path outer surface via the mixture flow path outer surface cooling structure.

18. The method of claim 17 wherein the second flow surface cooling structure includes a second flow surface coolant circulating chamber and cooling the at least some of the second flow surface includes circulating a second flow surface coolant fluid through the second flow surface coolant circulating chamber.

19. The method of claim 18 wherein the mixture flow path outer surface cooling structure includes a mixture flow path outer surface coolant circulating chamber and cooling the at least some of the mixture flow path outer surface includes circulating a coolant fluid through the mixture flow path outer surface coolant circulating chamber.

* * * * *